United States Patent
Bratt et al.

(10) Patent No.: US 8,711,173 B2
(45) Date of Patent: Apr. 29, 2014

(54) REPRODUCIBLE DITHER-NOISE INJECTION

(75) Inventors: Joseph P. Bratt, San Jose, CA (US); Peter F. Holland, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 584 days.

(21) Appl. No.: 13/026,557

(22) Filed: Feb. 14, 2011

(65) Prior Publication Data
US 2012/0206657 A1 Aug. 16, 2012

(51) Int. Cl.
*G09G 5/02* (2006.01)

(52) U.S. Cl.
USPC ........... 345/596; 345/589; 345/597; 345/616; 345/506; 348/574

(58) Field of Classification Search
USPC ........................................................ 348/574
See application file for complete search history.

(56) References Cited

U.S. PATENT DOCUMENTS

| | | | |
|---|---|---|---|
| 5,179,641 A | 1/1993 | Comins et al. | |
| 6,219,838 B1 | 4/2001 | Cherichetti et al. | |
| 2006/0183275 A1* | 8/2006 | Schoner et al. | 438/166 |
| 2007/0024636 A1 | 2/2007 | Lo | |
| 2007/0176949 A1 | 8/2007 | Chang et al. | |
| 2010/0135368 A1 | 6/2010 | Mehta et al. | |

* cited by examiner

*Primary Examiner* — Antonio A Caschera
(74) *Attorney, Agent, or Firm* — Lawrence J. Merkel; Meyertons, Hood, Kivlin, Kowert & Goetzel, P.C.

(57) ABSTRACT

A display pipe unit for processing pixels of video and/or image frames may be injected with dither-noise during processing of the pixels. A random noise generator implemented using Linear Feedback Shift Registers (LFSRs) produces pseudo-random numbers that are injected into the display pipe as dither-noise. Typically, such LFSRs shift freely during operation and the values of the LFSRs are used as needed. By shifting the LFSRs when the values are used to inject noise into newly received data, and not shifting the LFSRs when no new data is received, variations in the delays of receiving the data do not affect the pattern of noise applied to the frames. Therefore, dither-noise can be deterministically injected into the display pipe during testing/debug operation. By updating the LFSRs when new pixel data is available from the host interface instead of updating the LFSRs every cycle, the same dither-noise can be injected for the same received data.

22 Claims, 7 Drawing Sheets

| Description | Threshold | | | | | | | Probability | | | | | | |
|---|---|---|---|---|---|---|---|---|---|---|---|---|---|---|
| | P3 | P2 | P1 | M1 | M2 | M3 | | +3 | +2 | +1 | 0 | -1 | -2 | -3 |
| Equal (close) weighting | 219 (0xDB) | 183 (0xB7) | 146 (0x92) | 109 (0x6D) | 72 (0x48) | 36 (0x24) | | 14.1% | 14.1% | 14.4% | 14.8% | 14.4% | 14.1% | 14.1% |
| Equal, no +/- 3 | 255 (0xFF) | 204 (0xCC) | 153 (0x99) | 102 (0x66) | 51 (0x33) | 0 (0x00) | | 0% | 19.9% | 19.9% | 20.4% | 19.9% | 19.9% | 0% |
| Equal, no +/- 2 | 255 (0xFF) | 255 (0xFF) | 170 (0xAA) | 85 (0x55) | 0 (0x00) | 0 (0x00) | | 0% | 0% | 33% | 34% | 33% | 0% | 0% |
| No dither (default) | 255 (0xFF) | 255 (0xFF) | 255 (0xFF) | 0 (0xFF) | 0 (0x00) | 0 (0x00) | | 0% | 0% | 0% | 100% | 0% | 0% | 0% |

FIG. 5

| Random Number | LFSR bits |
|---|---|
| Rand0 [7:0] | LFSR [ 8: 1] |
| Rand1 [7:0] | LFSR [16: 9] |
| Rand2 [7:0] | LFSR [24:17] |
| Rand3 [7:0] | LFSR [32:25] |
| Rand4 [7:0] | LFSR [40:33] |
| Rand5 [7:0] | LFSR [48:41] |
| Rand6 [7:0] | LFSR [56:49] |
| Rand7 [7:0] | LFSR [64:57] |

| Random Number | LFSR bits |
|---|---|
| Rand8 [7:0] | LFSR [72:65] |
| Rand9 [7:0] | LFSR [80:73] |
| Rand10 [7:0] | LFSR [88:81] |
| Rand11 [7:0] | LFSR [96:89] |
| Rand12 [7:0] | LFSR [104:97] |
| Rand13 [7:0] | LFSR [112:105] |
| Rand14 [7:0] | LFSR [120:113] |
| Rand15 [7:0] | LFSR [13,127:121] |

FIG. 6

REPRODUCIBLE DITHER-NOISE INJECTION

BACKGROUND

1. Field of the Invention

This invention is related to the field of graphical information processing, more particularly, to conversion from one color space to another.

2. Description of the Related Art

Part of the operation of many computer systems, including portable digital devices such as mobile phones, notebook computers and the like is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel". For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. The intensity of each pixel can vary, and in color systems each pixel has typically three or four components such as red, green, blue, and black.

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically consists of a specified number of pixels according to the resolution of the image/video frame. Information associated with a frame typically consists of color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The color values can represent information corresponding to any one of a number of color spaces.

Under certain circumstances, the total number of colors that a given system is able to generate or manage within the given color space—in which graphics processing takes place—may be limited. In such cases, a technique called dithering is used to create the illusion of color depth in the images that have a limited color palette. In a dithered image, colors that are not available are approximated by a diffusion of colored pixels from within the available colors. Dithering in image and video processing is also used to prevent large-scale patterns, including stepwise rendering of smooth gradations in brightness or hue in the image/video frames, by intentionally applying a form of noise to randomize quantization error. Due to the random nature of the injected noise, it is oftentimes difficult to test the design of various graphics processing elements whose function is to perform the dither-noise injection.

Other corresponding issues related to the prior art will become apparent to one skilled in the art after comparing such prior art with the present invention as described herein.

SUMMARY

Dithering in image and video processing typically includes intentionally applying a form of noise to randomize quantization error, for example to prevent large-scale patterns, including stepwise rendering of smooth gradations in brightness or hue in the image/video frames. A display pipe unit for processing pixels of video and/or image frames may therefore be injected with dither-noise during processing of the pixels. It is desirable to make the injected noise reproducible for testing/debug purposes. A random noise generator implemented using a Linear Feedback Shift Register (LFSR) may produce pseudo random numbers that are injected into the display pipe as dither-noise. Typically, such LFSRs shift freely during operation and the value of the LFSR is used as needed. However, by shifting the LFSR when the value is used to inject noise into received new data, and not shifting the LFSR when not receiving new data, variations in the delays of receiving the image data do not affect the pattern of noise applied to the frames, and dither-noise can be deterministically injected into the display pipe during testing/debug operation. That is, by updating the LFSR when new pixel data is available from the host interface instead of updating the LFSR every cycle, the same dither-noise may be injected for the same received data.

Therefore, a dither unit in a video pipe within a display pipe may include a random noise generator (RNG), with the output of the RNG used to provide dither-noise for injection into a video image frame. The dither unit may also include a control unit coupled to the RNG, to update the output of the RNG responsive to receiving new image data for the video image frame. The control unit may also prevent a change in the output of the RNG in a given clock cycle responsive to detecting that no new image data for the video image frame has been received in the given clock cycle. In one set of embodiments, the RNG may be a linear feedback shift register (LFSR), and the output of the RNG may be an output of the LFSR. In these embodiments, to prevent a change in the output of the LFSR, the control unit is may prevent a shift of the LFSR, while to update the output of the LFSR, the control unit may shift the LFSR. The dither unit may further include a dither-value-generating unit to generate the dither-noise according to results of a comparison of the output of the RNG with one or more specified threshold values. The dither unit may be operated to seed the RNG with a same unique non-zero seed for a same given video image frame.

In one set of embodiments, a video pipe may include linear feedback shift registers (LFSRs), with each given LFSR corresponding to a respective plane of a color space, and providing pseudo-random numbers (PRNs) at its output. The video pipe may also include a dither-noise injection unit (DIU) to generate dither-noise values based on the PRNs output by the LFSRs, and inject the dither-noise values into image data of a given video image frame. The video pipe may further include a control unit for managing the LFSRs. The control unit may update the output of a given LFSR responsive to receiving new image data for the given video image frame, when the received new image data is associated with the plane of the color space to which the given LFSR corresponds. The control unit may also hold the output of the given LFSR at its current value in a given clock cycle, responsive to detecting that no new image data associated with the plane of the color space to which the given LFSR corresponds has been received for the given video image frame in the given clock cycle.

Each given LFSR may output a specified number of PRNs per clock cycle, with each given PRN (of the specified number of PRNs) corresponding to a different given data segment of the image data. For each given PRN, the DIU may generate a respective dither-noise value based on the given PRN, and inject the respective dither-noise value into the given data segment of the image data to which the given PRN corresponds. The DIU may generate the respective dither-noise value by comparing the given PRN to one or more threshold values associated with the respective plane of the color space to which the given LFSR outputting the given PRN corresponds. Furthermore, the DIU may generate the respective dither-noise value by selecting the respective dither-noise value from a set of available dither-noise values according to a result of the comparison of the given PRN to the one or more threshold values. When updating the output of a given LFSR, the control unit may step the given LFSR a specified number of times to update the PRNs output by the given LFSR.

In one embodiment, a display pipe comprises a fetch unit for fetching pixel data of a video frame, and a dither unit for injecting dither-noise into the video frame. The dither unit may therefore receive the fetched pixel data, generate pseudo random numbers (PRNs) used for injecting dither-noise into the fetched pixel data, update the PRNs in a given clock cycle responsive to detecting that the fetched pixel data includes new pixel data in the given clock cycle, and not update the PRNs in the given clock cycle responsive to detecting that the fetched pixel data does not include new pixel data in the given clock cycle. The dither unit generates the dither-noise based on the PRNs, and injects the dither-noise into the fetched pixel data using linear feedback shift registers (LFSRs) to provide the PRNs. Each given LFSR is associated with a different color plane, and is configured to generate a set of PRNs to be associated with a subset of the fetched pixel data, where the subset of the fetched pixel data is pixel data of the color plane with which the given LFSR is associated.

BRIEF DESCRIPTION OF THE DRAWINGS

The following detailed description makes reference to the accompanying drawings, which are now briefly described.

FIG. 5 is a table illustrating one possible set of threshold values used with pseudo-random numbers for generating dither-values.

FIG. 6 is a table illustrating one possible mapping of the output bits of a linear shift register to a set of pseudo-random numbers.

Figure 1:
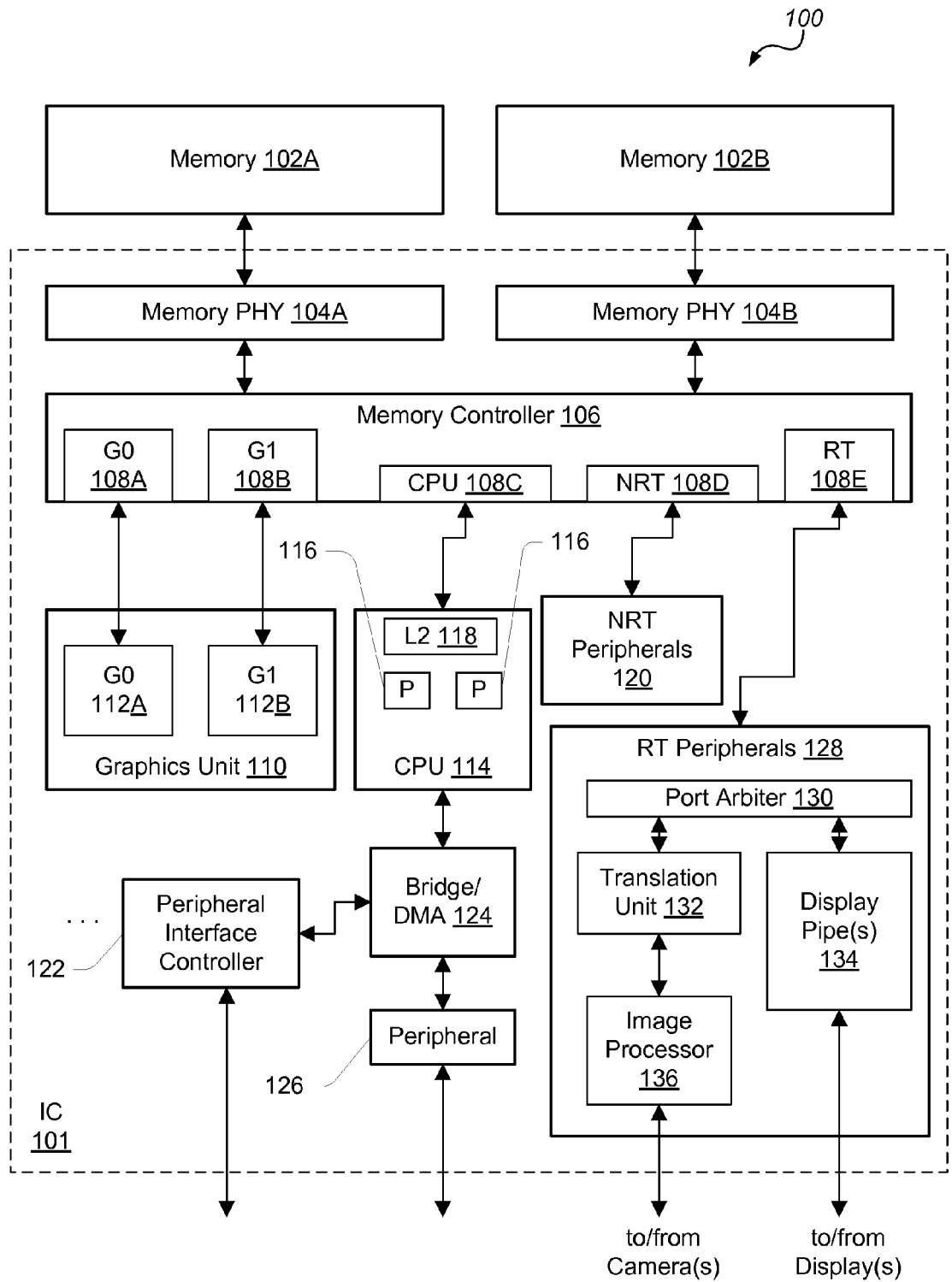
FIG. 1 is a block diagram of one embodiment of an integrated circuit that include a graphics display system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description.

As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system 100 is shown. In the embodiment of FIG. 1, system 100 includes an integrated circuit (IC) 101 coupled to external memories 102A-102B. In the illustrated embodiment, IC 101 includes a central processor unit (CPU) block 114, which includes one or more processors 116 and a level 2 (L2) cache 118. Other embodiments may not include L2 cache 118 and/or may include additional levels of cache. Additionally, embodiments that include more than two processors 116 and that include only one processor 116 are contemplated. IC 101 further includes a set of one or more non-real time (NRT) peripherals 120 and a set of one or more real time (RT) peripherals 128. In the illustrated embodiment, RT peripherals 128 include an image processor 136, one or more display pipes 134, a translation unit 132, and a port arbiter 130. Other embodiments may include more processors 136 or fewer image processors 136, more display pipes 134 or fewer display pipes 134, and/or any additional real time peripherals as desired. Image processor 136 may be coupled to receive image data from one or more cameras in system 100. Similarly, display pipes 134 may be coupled to one or more display controllers (not shown) which may control one or more displays in the system. Image processor 136 may be coupled to translation unit 132, which may be further coupled to port arbiter 130, which may be coupled to display pipes 134 as well. In the illustrated embodiment, CPU block 114 is coupled to a bridge/direct memory access (DMA) controller 124, which may be coupled to one or more peripheral devices 126 and/or to one or more peripheral interface controllers 122. The number of peripheral devices 126 and peripheral interface controllers 122 may vary from zero to any desired number in various embodiments. System 100 illustrated in FIG. 1 further includes a graphics unit 110 comprising one or more graphics controllers such as G0 112A and G1 112B. The number of graphics controllers per graphics unit and the number of graphics units may vary in other embodiments. As illustrated in FIG. 1, system 100 includes a memory controller 106 coupled to one or more memory physical interface circuits (PHYs) 104A-104B. The memory PHYs 104A-104B are configured to communicate with memories 102A-102B via pins of IC 101. Memory controller 106 also includes a set of ports 108A-108E. Ports 108A-108B are coupled to graphics controllers 112A-112B, respectively. CPU block 114 is coupled to port 108C. NRT peripherals 120 and RT peripherals 128 are coupled to ports 108D-108E, respectively. The number of ports included in memory controller 106 may be varied in other embodiments, as may the number of memory controllers. In other embodiments, the number of memory physical layers (PHYs) 104A-104B and corresponding memories 102A-102B may be less or more than the two instances shown in FIG. 1.

In one embodiment, each port 108A-108E may be associated with a particular type of traffic. For example, in one embodiment, the traffic types may include RT traffic, Non-RT (NRT) traffic, and graphics traffic. Other embodiments may include other traffic types in addition to, instead of, or in addition to a subset of the above traffic types. Each type of traffic may be characterized differently (e.g. in terms of requirements and behavior), and memory controller 106 may handle the traffic types differently to provide higher performance based on the characteristics. For example, RT traffic requires servicing of each memory operation within a specific amount of time. If the latency of the operation exceeds the specific amount of time, erroneous operation may occur in RT peripherals 128. For example, image data may be lost in image processor 136 or the displayed image on the displays to which display pipes 134 are coupled may visually distort. RT traffic may be characterized as isochronous, for example. On the other hand, graphics traffic may be relatively high bandwidth, but not latency-sensitive. NRT traffic, such as from processors 116, is more latency-sensitive for performance reasons but survives higher latency. That is, NRT traffic may generally be serviced at any latency without causing erroneous operation in the devices generating the NRT traffic. Similarly, the less latency-sensitive but higher bandwidth graphics traffic may be generally serviced at any latency. Other NRT traffic may include audio traffic, which is relatively low bandwidth and generally may be serviced with reasonable latency. Most peripheral traffic may also be NRT (e.g. traffic to storage devices such as magnetic, optical, or solid state storage). By providing ports 108A-108E associated with different traffic types, memory controller 106 may be exposed to the different traffic types in parallel.

As mentioned above, RT peripherals 128 may include image processor 136 and display pipes 134. Display pipes 134 may include circuitry to fetch one or more image frames and to blend the frames to create a display image. Display pipes 134 may further include one or more video pipelines, and video frames may be blended with (relatively) static image frames to create frames for display at the video frame rate. The output of display pipes 134 may be a stream of pixels to be displayed on a display screen. The pixel values may be transmitted to a display controller for display on the display screen. Image processor 136 may receive camera data and process the data to an image to be stored in memory.

Both the display pipes 134 and image processor 136 may operate in virtual address space, and thus may use translations to generate physical addresses for the memory operations to read or write memory. Image processor 136 may have a somewhat random-access memory pattern, and may thus rely on translation unit 132 for translation. Translation unit 132 may employ a translation look-aside buffer (TLB) that caches each translation for a period of time based on how frequently the translation is used with respect to other cached translations. For example, the TLB may employ a set associative or fully associative construction, and a least recently used (LRU)-type algorithm may be used to rank recency of use of the translations among the translations in a set (or across the TLB in fully associative configurations). LRU-type algorithms may include, for example, true LRU, pseudo-LRU, most recently used (MRU), etc. Additionally, a fairly large TLB may be implemented to reduce the effects of capacity misses in the TLB.

The access patterns of display pipes 134, on the other hand, may be fairly regular. For example, image data for each source image may be stored in consecutive memory locations in the virtual address space. Thus, display pipes 134 may begin processing source image data from a virtual page, and subsequent virtual pages may be consecutive to the virtual page. That is, the virtual page numbers may be in numerical order, increasing or decreasing by one from page to page as the image data is fetched. Similarly, the translations may be consecutive to one another in a given page table in memory (e.g. consecutive entries in the page table may translate virtual page numbers that are numerically one greater than or less than each other). While more than one page table may be used in some embodiments, and thus the last entry of the page table may not be consecutive to the first entry of the next page table, most translations may be consecutive in the page tables. Viewed in another way, the virtual pages storing the image data may be adjacent to each other in the virtual address space. That is, there may be no intervening pages between the adjacent virtual pages in the virtual address space.

Display pipes 134 may implement translation units that prefetch translations in advance of the display pipes' reads of image data. The prefetch may be initiated when the processing of a source image is to start, and the translation unit may prefetch enough consecutive translations to fill a translation memory in the translation unit. The fetch circuitry in the display pipes may inform the translation unit as the processing of data in virtual pages is completed, and the translation unit may invalidate the corresponding translation, and prefetch additional translations. Accordingly, once the initial prefetching is complete, the translation for each virtual page may frequently be available in the translation unit as display pipes 134 begin fetching from that virtual page. Additionally, competition for translation unit 132 from display pipes 134 may be eliminated in favor of the prefetching translation units. Since translation units 132 in display pipes 134 fetch translations for a set of contiguous virtual pages, they may be referred to as "streaming translation units."

In general, display pipes 134 may include one or more user interface units that are configured to fetch relatively static frames. That is, the source image in a static frame is not part of a video sequence. While the static frame may be changed, it is not changing according to a video frame rate corresponding to a video sequence. Display pipes 134 may further include one or more video pipelines configured to fetch video frames. These various pipelines (e.g. the user interface units and video pipelines) may be generally referred to as "image processing pipelines."

Returning to the memory controller 106, generally a port may be a communication point on memory controller 106 to communicate with one or more sources. In some cases, the port may be dedicated to a source (e.g. ports 108A-108B may be dedicated to the graphics controllers 112A-112B, respectively). In other cases, the port may be shared among multiple sources (e.g. processors 116 may share CPU port 108C, NRT peripherals 120 may share NRT port 108D, and RT peripherals 128 such as display pipes 134 and image processor 136 may share RT port 108E. A port may be coupled to a single interface to communicate with the one or more sources. Thus, when sources share an interface, there may be an arbiter on the sources' side of the interface to select between the sources. For example, L2 cache 118 may serve as an arbiter for CPU port 108C to memory controller 106. Port arbiter 130 may serve as an arbiter for RT port 108E, and a similar port arbiter (not shown) may be an arbiter for NRT port 108D. The single source on a port or the combination of sources on a port may be referred to as an agent. Each port 108A-108E is coupled to an interface to communicate with its respective agent. The interface may be any type of communication medium (e.g. a bus, a point-to-point interconnect, etc.) and may implement any protocol. In some embodiments, ports 108A-108E may all implement the same interface and protocol. In other embodiments, different ports may implement different interfaces and/or protocols. In still other embodiments, memory controller 106 may be single ported.

In an embodiment, each source may assign a quality of service (QoS) parameter to each memory operation transmitted by that source. The QoS parameter may identify a requested level of service for the memory operation. Memory operations with QoS parameter values requesting higher levels of service may be given preference over memory operations requesting lower levels of service. Each memory operation may include a flow ID (FID). The FID may identify a memory operation as being part of a flow of memory operations. A flow of memory operations may generally be related, whereas memory operations from different flows, even if from the same source, may not be related. A portion of the FID (e.g. a source field) may identify the source, and the remainder of the FID may identify the flow (e.g. a flow field). Thus, an FID may be similar to a transaction ID, and some sources may simply transmit a transaction ID as an FID. In such a case, the source field of the transaction ID may be the source field of the FID and the sequence number (that identifies the transaction among transactions from the same source) of the transaction ID may be the flow field of the FID. In some embodiments, different traffic types may have different definitions of QoS parameters. That is, the different traffic types may have different sets of QoS parameters.

Memory controller 106 may be configured to process the QoS parameters received on each port 108A-108E and may use the relative QoS parameter values to schedule memory operations received on the ports with respect to other memory operations from that port and with respect to other memory operations received on other ports. More specifically, memory controller 106 may be configured to compare QoS parameters that are drawn from different sets of QoS parameters (e.g. RT QoS parameters and NRT QoS parameters) and may be configured to make scheduling decisions based on the QoS parameters.

In some embodiments, memory controller 106 may be configured to upgrade QoS levels for pending memory operations. Various upgrade mechanism may be supported. For example, the memory controller 106 may be configured to upgrade the QoS level for pending memory operations of a flow responsive to receiving another memory operation from the same flow that has a QoS parameter specifying a higher QoS level. This form of QoS upgrade may be referred to as in-band upgrade, since the QoS parameters transmitted using the normal memory operation transmission method also serve as an implicit upgrade request for memory operations in the same flow. The memory controller 106 may be configured to push pending memory operations from the same port or source, but not the same flow, as a newly received memory operation specifying a higher QoS level. As another example, memory controller 106 may be configured to couple to a sideband interface from one or more agents, and may upgrade QoS levels responsive to receiving an upgrade request on the sideband interface. In another example, memory controller 106 may be configured to track the relative age of the pending memory operations. Memory controller 106 may be configured to upgrade the QoS level of aged memory operations at certain ages. The ages at which upgrade occurs may depend on the current QoS parameter of the aged memory operation.

Memory controller 106 may be configured to determine the memory channel addressed by each memory operation received on the ports, and may be configured to transmit the memory operations to memory 102A-102B on the corresponding channel. The number of channels and the mapping of addresses to channels may vary in various embodiments and may be programmable in the memory controller. Memory controller 106 may use the QoS parameters of the memory operations mapped to the same channel to determine an order of memory operations transmitted into the channel.

Processors 116 may implement any instruction set architecture, and may be configured to execute instructions defined in that instruction set architecture. For example, processors 116 may employ any microarchitecture, including but not limited to scalar, superscalar, pipelined, superpipelined, out of order, in order, speculative, non-speculative, etc., or combinations thereof. Processors 116 may include circuitry, and optionally may implement microcoding techniques, and may include one or more level 1 caches, making cache 118 an L2 cache. Other embodiments may include multiple levels of caches in processors 116, and cache 118 may be the next level down in the hierarchy. Cache 118 may employ any size and any configuration (set associative, direct mapped, etc.).

Graphics controllers 112A-112B may be any graphics processing circuitry. Generally, graphics controllers 112A-112B may be configured to render objects to be displayed, into a frame buffer. Graphics controllers 112A-112B may include graphics processors that may execute graphics software to perform a part or all of the graphics operation, and/or hardware acceleration of certain graphics operations. The amount of hardware acceleration and software implementation may vary from embodiment to embodiment.

NRT peripherals 120 may include any non-real time peripherals that, for performance and/or bandwidth reasons, are provided independent access to memory 102A-102B. That is, access by NRT peripherals 120 is independent of CPU block 114, and may proceed in parallel with memory operations of CPU block 114. Other peripherals such as peripheral 126 and/or peripherals coupled to a peripheral interface controlled by peripheral interface controller 122 may also be non-real time peripherals, but may not require independent access to memory. Various embodiments of NRT peripherals 120 may include video encoders and decoders, scaler/rotator circuitry, image compression/decompression circuitry, etc.

Bridge/DMA controller 124 may comprise circuitry to bridge peripheral(s) 126 and peripheral interface controller(s) 122 to the memory space. In the illustrated embodiment, bridge/DMA controller 124 may bridge the memory operations from the peripherals/peripheral interface controllers through CPU block 114 to memory controller 106. CPU block 114 may also maintain coherence between the bridged memory operations and memory operations from processors 116/L2 Cache 118. L2 cache 118 may also arbitrate the bridged memory operations with memory operations from processors 116 to be transmitted on the CPU interface to CPU port 108C. Bridge/DMA controller 124 may also provide DMA operation on behalf of peripherals 126 and peripheral interface controllers 122 to transfer blocks of data to and from memory. More particularly, the DMA controller may be configured to perform transfers to and from memory 102A-102B through memory controller 106 on behalf of peripherals 126 and peripheral interface controllers 122. The DMA controller may be programmable by processors 116 to perform the DMA operations. For example, the DMA controller may be programmable via descriptors, which may be data structures stored in memory 102A-102B to describe DMA transfers (e.g. source and destination addresses, size, etc.). Alternatively, the DMA controller may be programmable via registers in the DMA controller (not shown).

Peripherals 126 may include any desired input/output devices or other hardware devices that are included on IC 101. For example, peripherals 126 may include networking peripherals such as one or more networking media access controllers (MAC) such as an Ethernet MAC or a wireless fidelity (WiFi) controller. An audio unit including various audio processing devices may be included in peripherals 126. Peripherals 126 may include one or more digital signal processors, and any other desired functional components such as timers, an on-chip secrets memory, an encryption engine, etc., or any combination thereof.

Peripheral interface controllers 122 may include any controllers for any type of peripheral interface. For example, peripheral interface controllers 122 may include various interface controllers such as a universal serial bus (USB) controller, a peripheral component interconnect express (PCIe) controller, a flash memory interface, general purpose input/output (I/O) pins, etc.

Memories 102A-102B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 101 in a chip-on-chip configuration, a package-on-package configuration, or a multi-chip module configuration.

Memory PHYs 104A-104B may handle the low-level physical interface to memory 102A-102B. For example, memory PHYs 104A-104B may be responsible for the timing of the signals, for proper clocking to synchronous DRAM memory, etc. In one embodiment, memory PHYs 104A-104B may be configured to lock to a clock supplied within IC 101 and may be configured to generate a clock used by memory 102A and/or memory 102B.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 2:
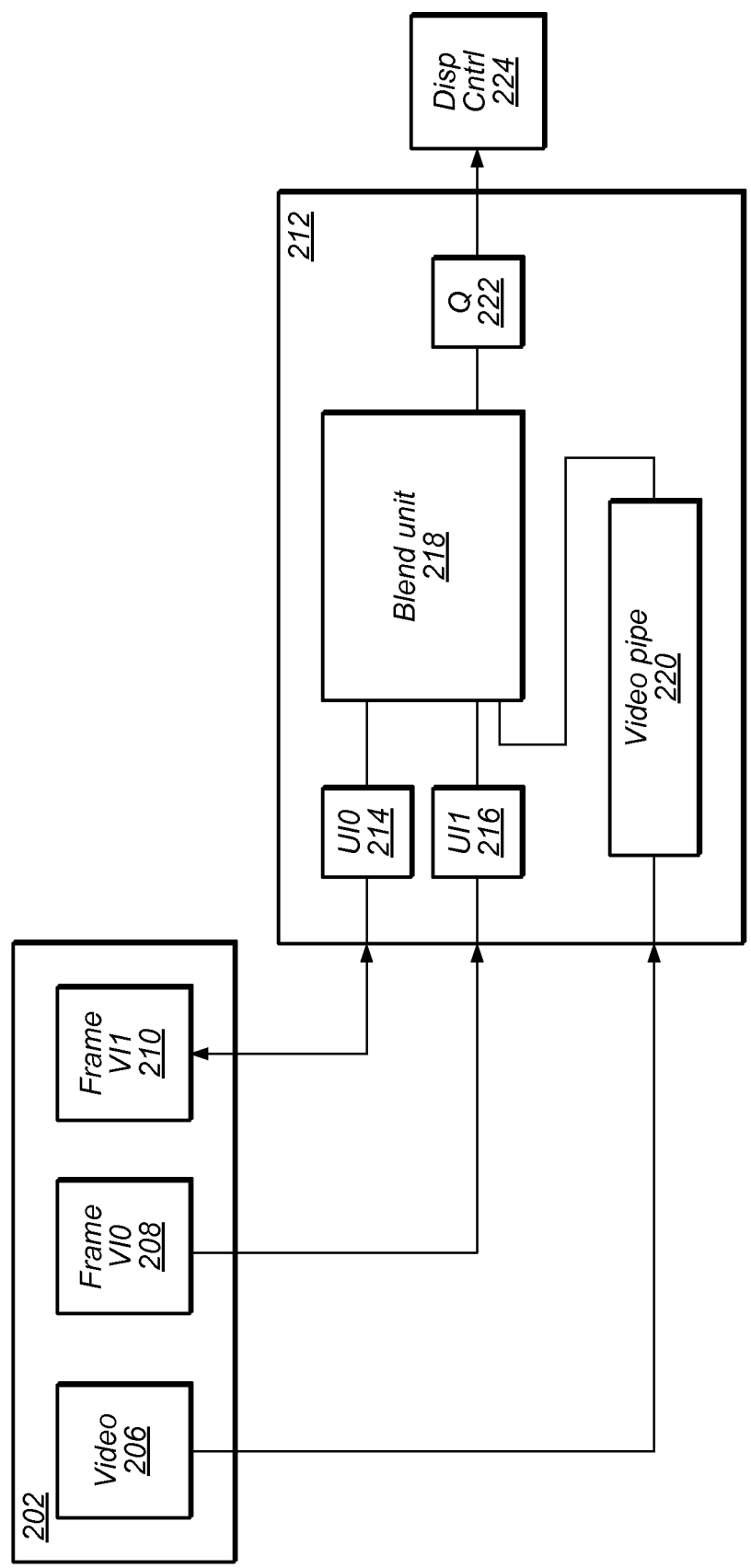
FIG. 2 is a block diagram of one embodiment of a graphics display system including system memory.

Turning now to FIG. 2, a partial block diagram is shown providing an overview of an exemplary system in which image frame information may be stored in memory 202, which may be system memory, and provided to a display pipe 212. As shown in FIG. 2, memory 202 may include a video buffer 206 for storing video frames/information, and one or more (in the embodiment shown, a total of two) image frame buffers 208 and 210 for storing image frame information. In some embodiments, the video frames/information stored in video buffer 206 may be represented in a first color space, according the origin of the video information. For example, the video information may be represented in the YCbCr color space. At the same time, the image frame information stored in image frame buffers 208 and 210 may be represented in a second color space, according to the preferred operating mode of display pipe 212. For example, the image frame information stored in image frame buffers 208 and 210 may be represented in the RGB color space. Display pipe 212 may include one or more user interface (UI) units, shown as UI 214 and 216 in the embodiment of FIG. 2, which may be coupled to memory 202 from where they may fetch the image frame data/information. A video pipe or processor 220 may be similarly configured to fetch the video data from memory 202, more specifically from video buffer 206, and perform various operations on the video data. One of these operations may include performing dither-noise injection on the fetched video frame(s), or, on the fetched pixels corresponding to a video frame(s), to prevent large-scale patterns, including preventing stepwise rendering of smooth gradations in brightness or hue in the video frame(s). To put it another way, display pipe unit 220 may inject the fetched video pixels of the video frames with dither-noise during processing of the pixels. UI 214 and 216, and video pipe 220 may respectively provide the fetched and processed image frame information and processed video image information to a blend unit 218 to generate output frames that may be stored in a buffer 222, from which they may be provided to a display controller 224 for display on a display device (not shown), for example an LCD.

In one set of embodiments, UI 214 and 216 may include one or more registers programmable to define at least one active region per frame stored in buffers 208 and 210. Active regions may represent those regions within an image frame that contain pixels that are to be displayed, while pixels outside of the active region of the frame are not to be displayed. In order to reduce the number of accesses that may be required to fetch pixels from frame buffers 208 and 210, when fetching frames from memory 202 (more specifically from frame buffers 208 and 210), UI 214 and 216 may fetch only those pixels of any given frame that are within the active regions of the frame, as defined by the contents of the registers within UI 214 and 216. The pixels outside the active regions of the frame may be considered to have an alpha value corresponding to a blend value of zero. In other words, pixels outside the active regions of a frame may automatically be treated as being transparent, or having an opacity of zero, thus having no effect on the resulting display frame. Consequently, the fetched pixels may be blended with pixels from other frames, and/or from processed video frame or frames provided by video pipe 220 to blend unit 218.

Figure 3:
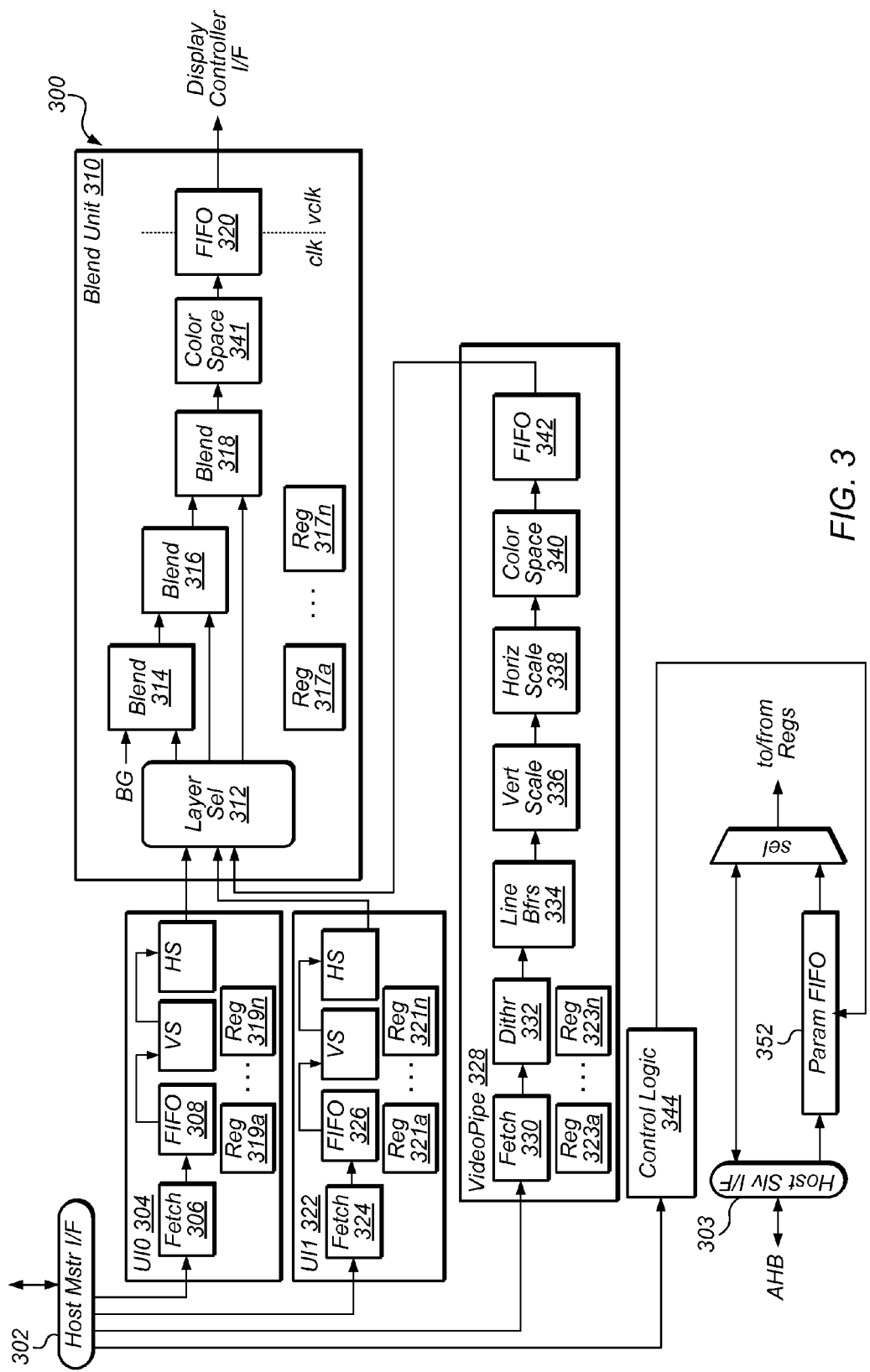
FIG. 3 is a block diagram of one embodiment of a display pipe in a graphics display system.

Turning now to FIG. 3, a more detailed logic diagram of one embodiment 300 of display pipe 212 is shown. In one set of embodiments, display pipe 300 may function to deliver graphics and video data residing in memory (or some addressable form of memory, e.g. memory 202 in FIG. 2) to a display controller or controllers that may support both LCD and analog/digital TV displays. The video data, which may be represented in a first color space, likely the YCbCr color space, may be dithered, scaled, converted to a second color space (for example the RGB color space) for use in blend unit 310, and blended with up to a specified number (e.g. 2) of graphics (user interface) planes that are also represented in the second (i.e. RGB) color space. Display pipe 300 may run in its own clock domain, and may provide an asynchronous interface to the display controllers to support displays of different sizes and timing requirements. Display pipe 300 may consist of one or more (in this case two) user interface (UI) blocks 304 and 322 (which may correspond to UI 214 and 216 of FIG. 2), a blend unit 310 (which may correspond to blend unit 218 of FIG. 2), a video pipe 328 (which may correspond to video pipe 220 of FIG. 2), a parameter FIFO 352, and Master and Slave Host Interfaces 302 and 303, respectively. The blocks shown in the embodiment of FIG. 3 may be modular, such that with some redesign, user interfaces and video pipes may be added or removed, or host master or slave interfaces 302 and 303 may be changed, for example.

Display pipe 300 may be designed to fetch data from memory, process that data, then presents it to an external display controller through an asynchronous FIFO 320. The display controller may control the timing of the display through a Vertical Blanking Interval (VBI) signal that may be activated at the beginning of each vertical blanking interval. This signal may cause display pipe 300 to initialize (Restart) and start (Go) the processing for a frame (more specifically, for the pixels within the frame). Between initializing and starting, configuration parameters unique to that frame may be modified. Any parameters not modified may retain their value from the previous frame. As the pixels are processed and put into output FIFO 320, the display controller may issue signals (referred to as pop signals) to remove the pixels at the display controller's clock frequency (indicated as vclk in FIG. 3).

In the embodiment shown in FIG. 3, each UI unit may include one or more registers 319a-319n and 321a-321n, respectively, to hold image frame information that may include active region information, base address information, and/or frame size information among others. Each UI unit may also include a respective fetch unit, 306 and 324, respectively, which may operate to fetch the frame information, or more specifically the pixels contained in a given frame from memory, through host master interface 302. As previously mentioned, the pixel values may be represented in the color space designated as the operating color space of the blend unit, in this case the RGB color space. In one set of embodiments, fetch units 306 and 324 may only fetch those pixels of any given frame that are within the active region of the given frame, as defined by the contents of registers 319a-319n and 321a-321n. The fetched pixels may be fed to respective FIFO buffers 308 and 326, from which the UI units may provide the fetched pixels to blend unit 310, more specifically to a layer select unit 312 within blend unit 310. Blend unit 310 may then blend the fetched pixels obtained from UI 304 and 322 with pixels from other frames and/or video pixels obtained from video pipe 328. The pixels may be blended in blend elements 314, 316, and 318 to produce an output frame or output frames, which may then be passed to FIFO 320 to be retrieved by a display controller interface coupling to FIFO 320, to be displayed on a display of choice, for example an LCD. In one set of embodiments, the output frame(s) may be converted back to the original color space of the video information, e.g. to the YCbCr color space, to be displayed on the display of choice.

Blend unit 310 may be situated at the backend of display pipe 300 as shown in FIG. 3. It may receive frames of pixels represented in a second color space (e.g. RGB) from UI 304 and 322, and pixels represented in a first color space (e.g. YCbCr) from video pipe 328, and may blend them together layer by layer, through layer select unit 312, once the pixels obtained from video pipe 328 have been converted to the second color space, as will be further described below. The final resultant pixels (which may be RGB of 10-bits each) may be converted to the first color space through color space converter unit 341 (as will also be further described below), queued up in output FIFO 320 at the video pipe's clock rate of clk, and fetched by a display controller at the display controller's clock rate of vclk. It should be noted that while FIFO 320 is shown inside blend unit 310, alternative embodiments may position FIFO 320 outside blend unit 310 and possibly within a display controller unit. In addition, while color space conversion by converter unit 341 is shown to take place prior to providing the resultant pixels to FIFO 320, in alternate embodiments the color conversion may be performed on the data fetched from FIFO 320.

The sources to blend unit 310 (UI 304 and 326, and/or video pipe 328) may provide the pixel data and per-pixel Alpha values (which may be 8-bit and define the transparency for the given pixel) for an entire frame with width, display width, and height, display height, in pixels starting at a specified default pixel location, (e.g. 0,0). Blend unit 310 may functionally operate on a single layer at a time. The lowest level layer may be defined as the background color (BG, provided to blend element 314). Layer 1 may blend with layer 0 (at blend element 316). The next layer, layer 2, may blend with the output from blend element 316 (at blend element 318), and so on until all the layers are blended. For the sake of simplicity, only three blend elements 314-318 are shown, but display pipe 300 may include more or less blend elements depending on the desired number of processed layers. Each layer (starting with layer 1) may specify where its source comes from to ensure that any source may be programmatically selected to be on any layer. As mentioned above, as shown, blend unit 310 has three sources (UI 304 and 322, and video pipe 328) to be selected onto three layers (using blend elements 314-318). A CRC (cyclic redundancy check) may also be performed on the output of blend unit 310. Blend unit 310 may also be put into a CRC only mode, where only a CRC is performed on the output pixels without them being sent to the display controller.

Each source (UI 304 and 322, and video pipe 328) may provide a per pixel Alpha value. The Alpha values may be used to perform per-pixel blending, may be overridden with a static per-frame Alpha value (e.g. saturated Alpha), or may be combined with a static per-frame Alpha value (e.g. Dissolve Alpha). Any pixel locations outside of a source's valid region may not be used in the blending. The layer underneath it may show through as if that pixel location had an Alpha of zero. An Alpha of zero for a given pixel may indicate that the given pixel is invisible, and will not be displayed.

In one set of embodiments, valid source regions, referred to as active regions may be defined as the area within a frame that contains valid pixel data. Pixel data for an active region may be fetched from memory by UI 304 and 322, and stored within FIFOs 308 and 326, respectively. An active region may be specified by starting and ending (X,Y) offsets from an upper left corner (0,0) of the entire frame. The starting offsets may define the upper left corner of the active region, and the ending offsets may define the pixel location after the lower right corner of the active region. Any pixel at a location with coordinates greater than or equal to the starting offset and less than the ending offset may be considered to be in the valid region. Any number of active regions may be specified. For example, in one set of embodiments there may be up to four active regions defined within each frame and may be specified by region enable bits. The starting and ending offsets may be aligned to any pixel location. An entire frame containing the active regions may be sent to blend unit 310. Any pixels in the frame, but not in any active region would not be displayed, and may therefore not participate in the blending operation, as if the pixels outside of the active had an Alpha value of zero.

In alternate embodiments, blend unit 310 may be designed to receive pixel data for only the active regions of the frame instead of receiving the entire frame, and automatically treat the areas within the frame for which it did not receive pixels as if it had received pixels having a blending value (Alpha value) of zero.

In one set of embodiments, one active region may be defined within UI 304 (in registers 319a-319n) and/or within UI 322 (in registers 321a-321n), and may be relocated within the display destination frame. Similar to how active regions within a frame may be defined, the frame may be defined by the pixel and addressing formats, but only one active region may be specified. This active region may be relocated within the destination frame by providing an X and Y pixel offset within that frame. The one active region and the destination position may be aligned to any pixel location. It should be noted that other embodiments may equally include a combination of multiple active regions being specified by storing information defining the multiple active regions in registers 319a-319n and in registers 321a-321n, and designating one or more of these active regions as active regions that may be relocated within the destination frame as described above.

In one set of embodiments, the active regions in a frame may represent graphics overlay to appear on top of another image or a video stream. For example, the active regions may represent a static image superimposed atop a video stream. In some embodiments, active regions may more generally represent an overlay window that may be used to superimpose any desired information atop information presented in the background layer underneath. For example, display pipe 212 may include more than one video pipe similar to video pipe 220 (or 328, as shown in FIG. 3), and overlay video information in the active region. Similarly, instead of a video stream, static images may be displayed underneath the active regions, and so forth. Referring again to FIG. 3, video pipe 328 may provide a video stream to blend unit 310, while UI 304 and 322 may provide image frames with pixels in the active region representing a static image overlay to be displayed atop the video stream. In this case, the output frames provided from FIFO 320 to the display controller may include video pixel information from video pipe 328, with the fetched pixels from FIFOs 308 and/or 326 superimposed on top of the video pixel information, blended together by blend unit 310 according to the Alpha values and other pertinent characteristics of the fetched pixels. Again, different embodiments may include various combinations of video and static image information blended and displayed, with the functionality of the display pipe expanded accordingly with additional video pipes and/or user interfaces as needed. Blend unit 310 may similarly be expanded to accommodate the additional pixels that may need to be blended.

Referring again to FIG. 3, using fetch unit 330, video pipe 328 may fetch video frame data/information from memory through host master interface 302. The video frame data/information may be represented in a given color space, for example YCbCr color space. Video pipe 328 may inject random noise (dither) into the samples, that is, into the pixels that make up the video frame (using dither unit 332), and scale the resultant data in both vertical and horizontal directions (scalers 336 and 338) after buffering the dithered data (buffers 334). As previously mentioned, dither-noise may be injected into the video frame (pixels) in order to prevent large-scale patterns, including stepwise rendering of smooth gradations in brightness or hue in the image/video frames. To put it another way, random noise (dither-noise) may be injected to make the displayed image(s) look more natural. In one set of embodiments, the input pixel data may be of a specific size, expressed as a specified number S of data units of size N, (e.g. 16-bytes wide, or 16 data units with a data unit specified to be a byte, the size of the input data thereby expressed as S*N=128 bits in this case). The input pixel data (of size S*N, as explained above) from host master interface 302 has the option of random noise being injected into it by dither unit 332, prior to being buffered (line buffers 334) and scaled (vertical scaler 336 and horizontal scaler 338). Under certain conditions, dither unit 332 may not inject any random noise, and the fetched pixels may simply be passed through dither unit 332 and stored in line buffers 334.

When dither unit 332 does inject random (dither) noise into the fetched video pixels, respective dither-noise may be added to each data unit (i.e. to each N-bit chunk of data, e.g. to each byte if N=8) from a specified dither set containing a specified number of values. That is, the value of the injected noise may be selected from the specified dither set. In one embodiment, the dither set includes the following elements: {+3, +2, +1, 0, −1, −2, −3}. An N-bit (e.g. 8-bit) random number (Rand) may be compared to an N-bit threshold value obtained from a set of N-bit threshold values, and the result of the comparison may determine the value of the dither-noise selected from the specified dither set. When operating in a color space having multiple components, there may be a separate set of controls and threshold values for each component.

For example, when operating in the YCbCr color space, there may be a separate set of controls and threshold values for Luma (Y), Chroma-Blue (Cb), and Chroma-Red (Cr). The number of threshold values used for each component may also be specified. For example, six different threshold values may be specified: P3Threshold, P2Threshold, P1Threshold, M1Threshold, M2Threshold, and M3Threshold. In one embodiment, the threshold values are specified to meet the following constraints:

P3Threshold>=P2Threshold>=P1Threshold>=M1Threshold>=M2Threshold>=M3Threshold, and the dither-value (DithValue) from the specified dither set is selected based on the following conditions:

if (Rand>P3Threshold)DithValue=3;

else if (Rand>P2Threshold)DithValue=2;

else if (Rand>P1Threshold)DithValue=1;

else if (Rand>=M1Threshold)DithValue=0;

else if (Rand>=M2Threshold)DithValue=−1;

else if (Rand>=M3Threshold)DithValue=−2;

else DithValue=−3.

The table in FIG. 5 shows some examples of threshold settings that may be used for the comparisons with the pseudo-random numbers generated by the RNGs (in the LFSRs). More specifically, the table of FIG. 5 shows possible threshold values for equal weighting, for equal weighting excluding ±3 value, for equal weighting excluding ±3 and ±2 values, and for no dithering. The probability column indicates the probability of a given dither-value being selected for each given case.

Figure 4:
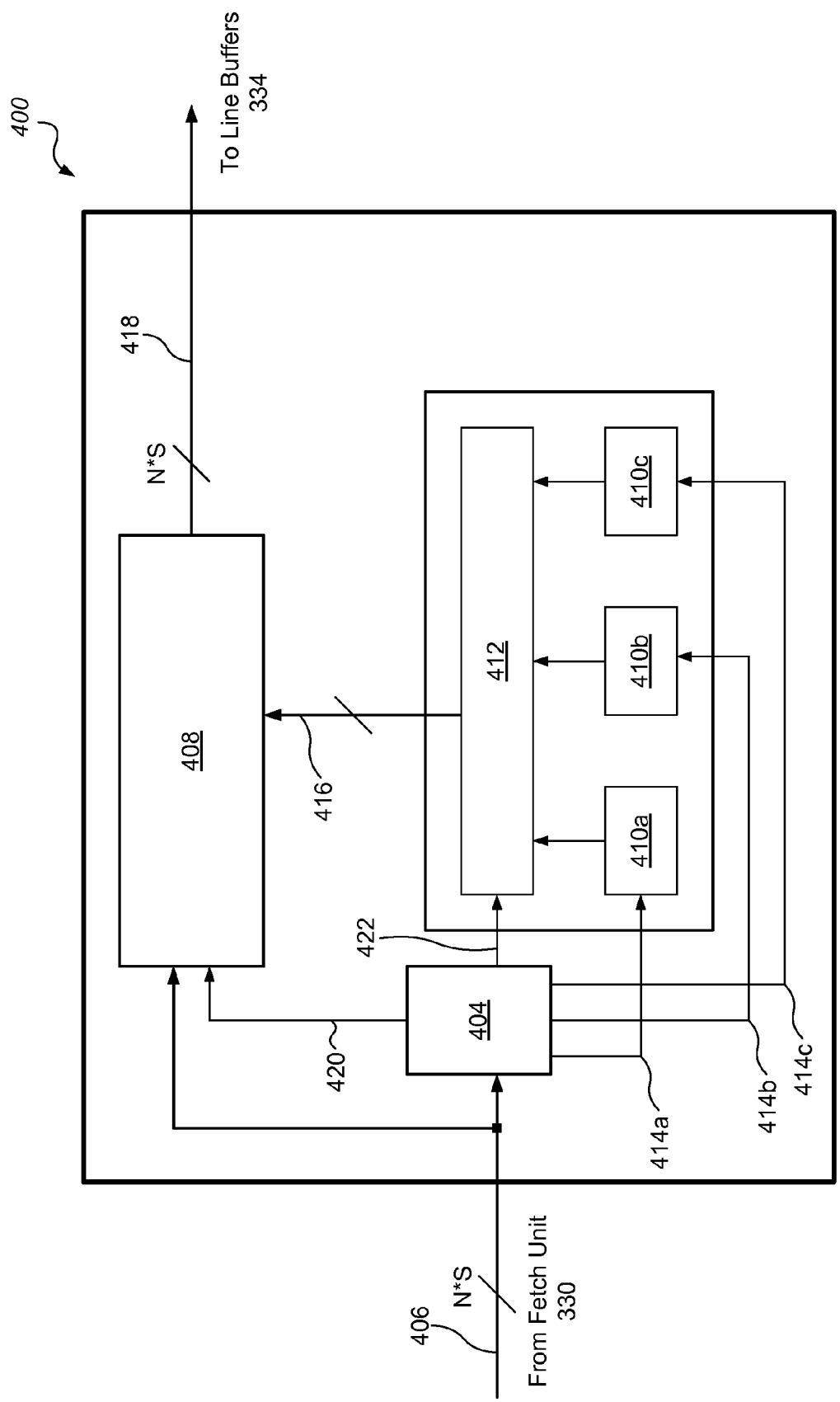
FIG. 4 is a block diagram of one embodiment of a dither unit included in the display pipe.

FIG. 4 shows a functional block diagram of one possible embodiment 400 of the internal structure of dither unit 332. Dither unit 400 is implemented for the processing of video image frames in a color space with three separate planes or components. Accordingly, dither unit 400 may include generators (RNGs) 410a-410c to generate the N-bit number (Rand) used for threshold comparison. As seen in FIG. 4, the are separate RNGs for each of the color space components (e.g. for Y, Cb, and Cr, when working in the YCbCr color space), to provide deterministic dithering for verification purposes. By assigning different respective RNGs to each component (or plane), the order in which reads—for pixel data—to different planes are completed does not affect the values used for dithering. That is, the values used for dithering are not affected by the order of the color components/planes with which the incoming pixel data is associated. For example, for a 3-plane video source, e.g. a YCbCr color space/plane, plane 1 may contain Y values, plane 2 may contain Cb values, and plane 3 may include Cr values. If a single LFSR were used, dithering would be different for pixel data returned in the order <Lm0, Cb0, Cr0, Lm1, Cb1, Cr1>, and pixel data returned in the order <Cb0, Cb1, Lm0, Cr0, Lm1, Cr1>. Providing a respective RNG for each component/plane makes it possible to achieve deterministic dithering for verification purposes, as will further be described below.

RNGs 410a-410c may be implemented as M-bit Linear Feedback Shift Registers (LFSRs), with M=[N*S]−1, where S is the stream size, or number of data units, and N is the bit-size of each data unit. For example, if the data unit is a byte, and the incoming stream size is 16 bytes, then M=127, and sixteen 8-bit random numbers may be generated, one for each byte of the incoming data stream. One of the bits may be duplicated to produce the 128 bits for sixteen 8-bit random numbers. In one set of embodiments, dithering for a given color component/plane may be performed once a specified number of data units have been collected for the given component. In other words, dithering for a given component may be performed when the received number of N-bit chunks of pixel data associated with the given component reaches the stream size, or 'S'. For example, when S=16 and N=8, sixteen bytes of pixel data associated with a given component may be collected before dithering is performed for the pixel data associated with the given component. This may take one or more clock (or data) cycles, depending on how many data units received in succession are associated with the given component. For example, the process may take one, two, or four data cycles. One data cycle for a given component if all incoming pixel data is associated with the given component, two cycles if half the incoming pixel data is associated with the given component, and four cycles if a quarter of the incoming pixel data is associated with the given component. Once the specified number of data units (e.g. sixteen bytes of pixel data) associated with the given component has been collected, each byte may be dithered according to an associated byte from the LFSR corresponding to the given component. More generally, dithering for pixel data associated with a given color component/plane may be performed once a specified number of pixels (e.g. S*N) associated with the given component/plane has been received.

Each LFSR 410a-410c may be initialized with a unique programmable non-zero seed, and may use a polynomial. LFSRs 410a-410c may operate to produce the same sequence of pseudo-random numbers when starting from the same unique programmable non-zero seed. In one embodiment, the polynomial is:

$1+x^{126}+x^{127}$, or for each step:

for (i=2 . . . 127)LFRS[i]=LFRS[i−1]

LFSR[1]=LFRS[126]^LFSR[127]

For each new random number value generation (RNG update), the LSFR may be stepped the equivalent of 127 times. Or for each RNG update (the equivalent of 127 steps):

for (i=2 . . . 127)LFRS[i]=LFRS[i]^LFSR[i−1]

LFSR[1]=LFRS[1]^LFRS[126]^LFSR[127].

The table in FIG. 6 shows which bits may be used to generate the sixteen 8-bit random numbers (Rand0-Rand15) from a 127-bit LFSR, according to one embodiment. The index of the Random Number corresponds to the byte number that is dithered. It should be noted that bit 13 is used twice.

As previously mentioned, in order to perform deterministic dithering, a respective RNG (LFSR) may be assigned to each given color plane/component. Thus, LFSR 410a may be assigned to plane 1, LFSR 410b may be assigned to plane 2, and LFSR 410c may be assigned to plane 3. Deterministically testing and/or debugging operation of the video pipe, including testing/debugging the dithering operation, may involve reproducing the same injected noise for the same given image/video frame. Therefore, in addition to providing a respective RNG for each color plane/component, a specified number of programmable choices may also be made available for updating the RNG output. In one set of embodiments, a control mechanism (e.g. a control circuit 404 or instructions executable by a processing unit) may be programmable to control update of the LFSR output. As shown in FIG. 4, respective control signals 414a-414c may be supplied from control unit 404 to LFSRs 410a-410c, to control the updating of the respective output of each one of LFSRs 410a-410c. The respective pseudo-random numbers generated by each of LFSRs 410a-410c may be provided to processing block 412 via output 416. Processing block 412 may perform the threshold comparisons, and provide the selected dither-values to injection block 408, where the dither-values may be injected into the appropriate pixels (per data unit, e.g. per byte, as described above). The dithered pixel data may then be output to line buffers 334 via output line 418.

In one set of embodiments, the control mechanism may be programmable to update LFSRs 410a-410c every cycle, or update LFSRs 410a-410c when new data is available from the host interface via data input line 406, or update LFSRs 410a-410c under program control. For deterministic dithering during testing and debug, LFSRs 410a-410c may be updated each time new data is available from the host interface (e.g. from host master interface 302), while retaining their respective present values responsive to not receiving new data from the host interface. To put it another way, by shifting the LFSRs only when the value is used to inject noise into newly received video image data, variations in the delays of receiving the new data do not affect the pattern of noise applied to the frames, and dither-noise can be deterministically injected into the display pipe during testing/debug operation. This is possible since the LFSRs may produce the same pseudo-random number sequence when starting from the same unique programmable non-zero seed, as mentioned above. Control block 404 may generate control signals 414a-414c according to the incoming pixel data from input lines 406, and may also provide a respective control signal 422 to processing block 412 and a respective control signal 420 to injection block 408, to control the comparison and dither injection operations. It should be noted that in alternate embodiments, the various control signals 414a-414c, 420, and 422 may be provided from different components, and may be generated outside dither unit 400 (outside dither unit 332, in FIG. 3), depending on the overall system configuration, and deterministic dithering may equally be performed in those cases, provided that each image plan is provided with a corresponding RNG, and the output of each RNG is updated when new image data is received, while retaining its current value when no new image data is received.

Consequently, when identical dithering is required, the LFSRs may simply be reinitialized for each frame with the same respective seeds. By updating the LFSR when new pixel data is available from the host interface instead of updating the LFSR every cycle, the same dither-noise may be injected for the same received data, and proper dither operation of the display pipe may thus be tested. The RNG may also be operated to not reset during a restart, and the dithering between two frames with identical configuration parameters may be different between the two frames.

In some embodiments, blend unit 310 may expect video (pixel) data to be represented in a different color space than the original color space (which, as indicated above, may be the YCbCr color space). In other words, blend unit 310 may operate in a second color space, e.g. in the RGB color space. Therefore, the video frame data may be converted from the first color space, in this case the YCbCr color space, to the second color space, in this case the RGB color space, by color space converter unit 340. It should be noted that while color space converter unit 340 is shown situated within video pipe 328, it may be situated anywhere between the output provided by video pipe 328 and the input provided to blend unit 310, as long as the data that is ready to be provided to blend unit 310 has been converted from the first color space to the second color space prior to the data being processed and/or operated upon by blend unit 310.

The converted data (that is, data that is represented in the second color space, in this case in the RGB color space) may then be buffered (FIFO 342), before being provided to blend unit 310 to be blended with other planes represented in the second color space, as previously discussed. During the process of converting data represented in the first color space into data represented in the second color space, there may be some colors represented in the first (i.e. the YCbCr) color space that cannot be represented in the second (i.e. RGB) color space. For example, the conversion may yield an R, G, or B component value of greater than 1 or less than 0. Displaying videos on certain display devices may therefore yield different visual results than desired and/or expected. Therefore, in at least one set of embodiments, blend unit 310 may be designed to perform blending operations using the converted pixel values even when the converted pixel values do not represent valid pixel values in the second color space. For example, if the second color space (or the operating color space of blend unit 310) is the RGB color space, blend unit 310 may allow RGB values as high as +4 and as low as −4. Of course these values may be different, and may also depend on what the original color space is. While these values may not represent valid pixel values in the second (i.e. RGB) color space, they can be converted back to the correct values in the first (i.e. the YCbCr) color space. Accordingly, the color information from the original (YCbCr) color space may be maintained through video pipe 328, and may be displayed properly on all display devices that display the video frames.

Thus, before displaying the blended pixels output by blend element 318, the blended pixels may be converted from the second color space (i.e. RGB in this case) to the original video color space (i.e. the YCbCr color space in this case) through color space conversion unit 341. As was the case with video pipe 328, while color space conversion unit 341 is shown situated within blend unit 310 and between blend element 318 and FIFO 320, in alternate embodiments the color space conversion may be performed on the display controller side, prior to being provided to the display, and various other embodiments are not meant to be limited by the embodiment shown in FIG. 3.

In one set of embodiments, a parameter FIFO 352 may be used to store programming information for registers 319*a*-319*n*, 321*a*-321*n*, 317*a*-317*n*, and 323*a*-323*n*. Parameter FIFO 352 may be filled with this programming information by control logic 344, which may obtain the programming information from memory through host master interface 302. In some embodiments, parameter FIFO 352 may also be filled with the programming information through an advanced high-performance bus (AHB) via host slave interface 303.

Figure 7:
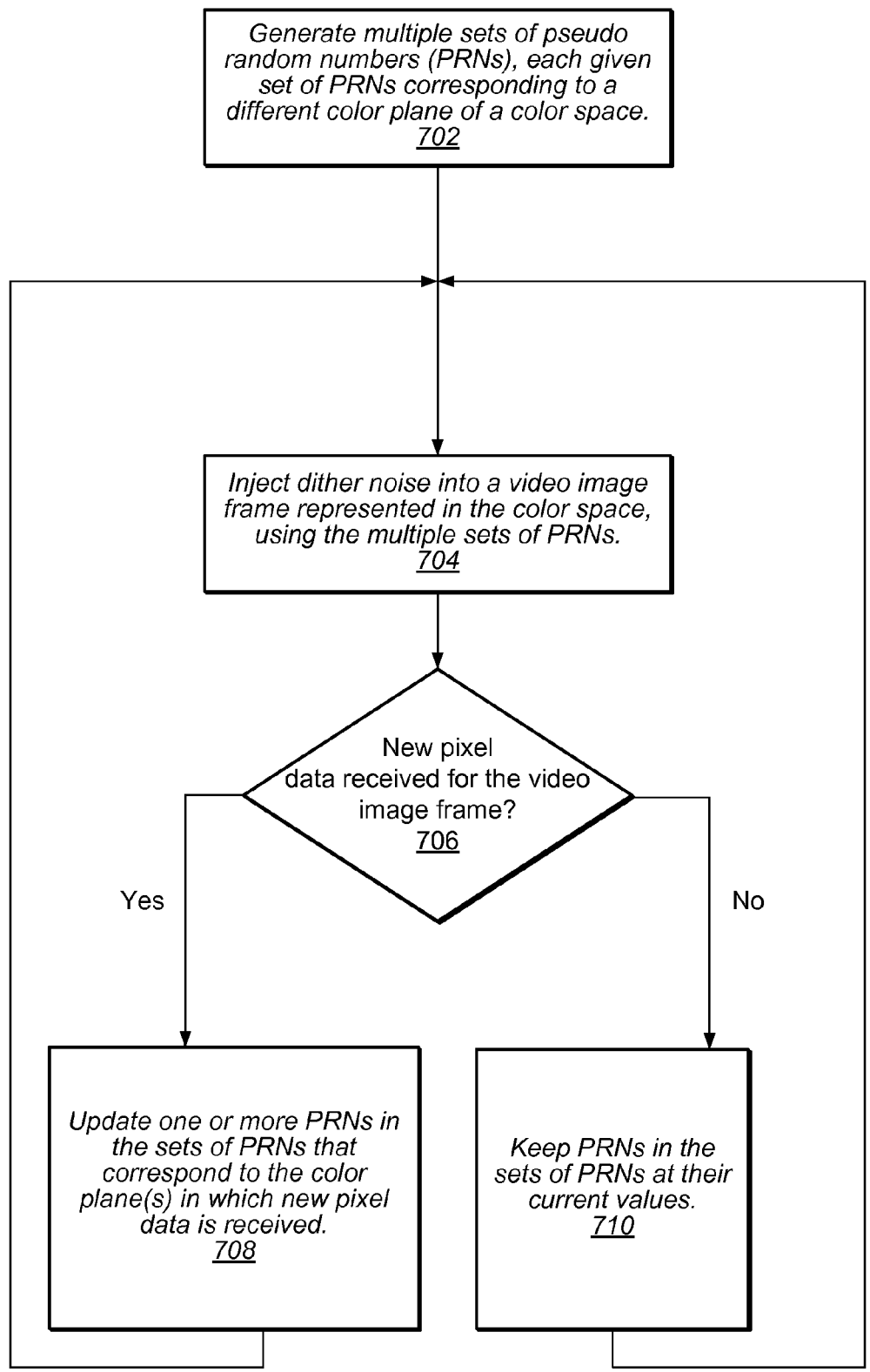
FIG. 7 is a flow diagram showing one embodiment of a method for performing dithering in a display pipe.

Turning now to FIG. 7, a flowchart is shown illustrating one embodiment of a method for performing dithering in a video pipe. As shown in FIG. 7, multiple sets of pseudo random numbers (PRNs) may be generated, each given set of PRNs corresponding to a different color plane of a color space (702). The multiple sets of PRNs may be used to inject dither-noise into a video image frame represented in the color space (704). In one set of embodiments, the dither-noise may be injected according to the color planes, using a given set of PRNs for generating corresponding dither-noise to be injected into pixel data in the given color plane to which the given set of PRNs correspond. During each given clock cycle of an operating clock, it may be determined whether new pixel data has been received for the video image frame (706). If it determined that new pixel data has indeed been received for the video image frame in the given clock cycle ('yes' branch of 706), one or more PRNs may be updated in the sets of PRNs that correspond to the color plane(s) in which new pixel data is received (708). If it is determined that no new pixel data has indeed been received for the video image frame in the given clock cycle ('no' branch of 706), the PRNs in the sets of PRNs may be kept at their current values (710). This allows deterministic dithering, for the dither-values may be the same for the same pixel data, when the PRNs are generated with the same seeds for the same image video frame. In some embodiments, the multiple sets of PRNs may be generated by linear feedback shift registers (LFSRs), with each given LFSR generating a given output that provides one of the sets of PRNs. Thus, a separate LFSR may be operated for each separate color plane. When using LFSRs, the PRNs in a given set of PRNs may be updated by shifting the LFSR that generates the given output providing the given set of PRNs. Similarly, the PRNs may be kept from updating by preventing the given LFSR from shifting in a given clock cycle.

Turning now to FIG. 6, a flowchart is shown illustrating another embodiment of a method for performing dithering in a video pipe. Video frame information represented in a first color space may be fetched (802). Fetching the video frame information may include fetching first pixel values corresponding to a first color plane of the color space, and fetching second pixel values corresponding to a second color plane of the color space (802). This may be performed during each given clock cycle of an operating clock, and may include fetching new pixel information for the video frame, or suspending fetching new video frame information, for example when the video stream is paused. Pseudo random numbers (PRNs) may be generated for dithering, including generating first PRNs associated with the first color plane, and second PRNs associated with the second color plane (804). In any given clock cycle of the operating clock, the first PRNs and the second PRNs may be updated or they may be prevented from updating. If it is detected that a specified number of new first pixel values have been fetched since a most recent previous updating of the first PRNs ('yes' branch of 806), the first PRNs may be updated (812). Otherwise, ('no' branch of 806), the first PRNs may be prevented from updating (810). Similarly, if it is detected that a specified number of new second pixel values have been fetched since a most recent previous updating of the second PRNs ('yes' branch of 808), the second PRNs may be updated (816). Otherwise, ('no' branch of 808), the second PRNs may be prevented from updating (814).

Figure 8:
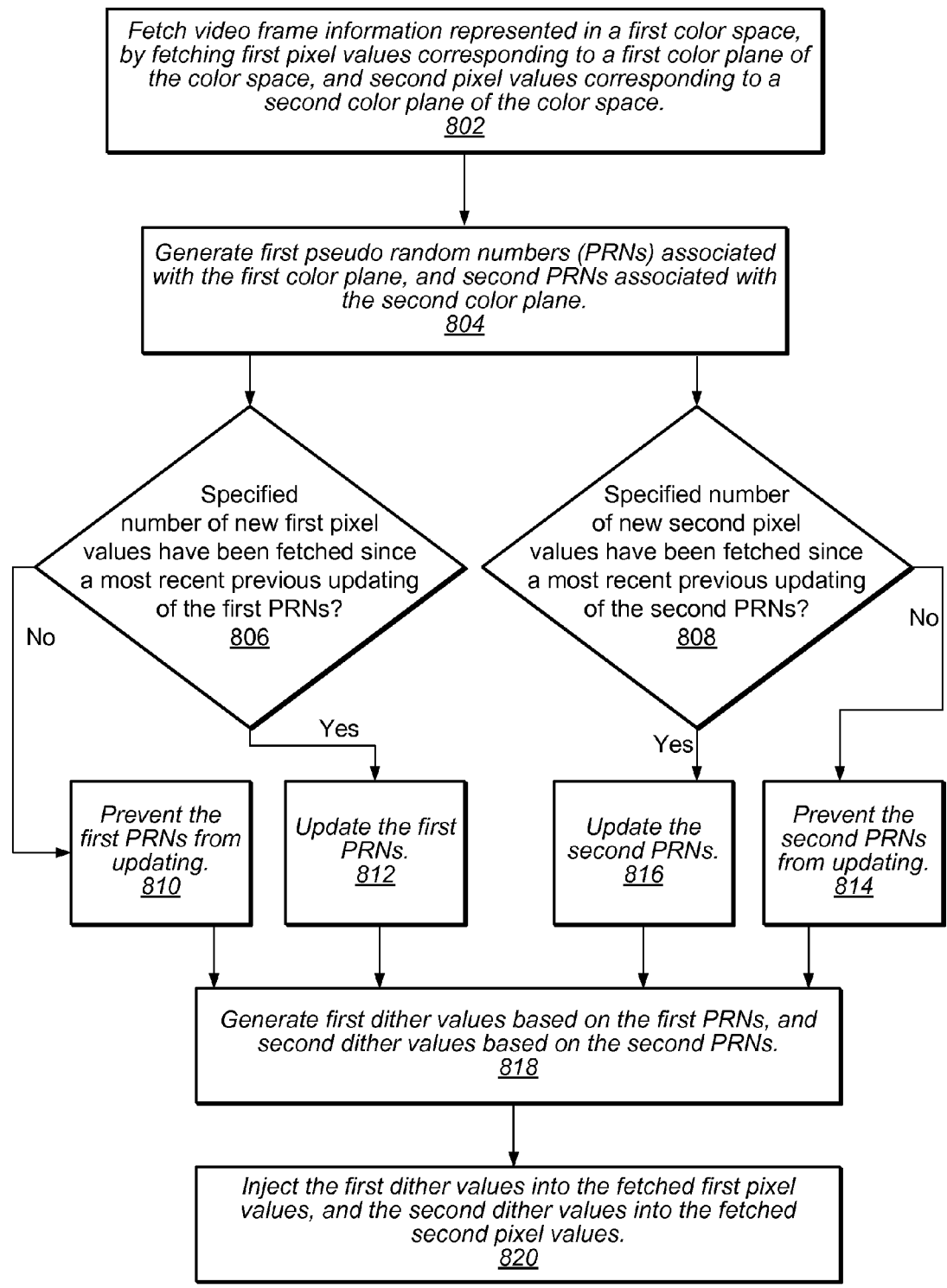
FIG. 8 is a flow diagram showing an alternate embodiment of a method for performing dithering in a display pipe.

First dither-values may be generated based on the first PRNs, and second dither-values may be generated based on the second PRNs (818), and the first dither-values may be injected into the fetched first pixel values, and the second dither-values may be injected into the fetched second pixel values (820). As mentioned above, the flowchart shown in FIG. 8 may represent steps performed in each given clock cycle of an operating clock, where new video frame information may or may not be fetched in each given clock cycle. The specified number (of new first pixel values and new second pixel values) may correspond to a width of a host interface over which the fetching of the video frame pixels is performed, and the first PRNs may be generated by a first linear feedback shift register (LFSR) providing the first PRNs at its output, and the second PRNs may be generated by a second LFSR providing the second PRNs at its output. In such cases, each PRN of the first PRNs and each PRN of the second PRNs may include a same specified number of bits, and the total number of bits output by the first LFSR during the given clock cycle may correspond to the width of the host interface, and similarly, the total number of bits output by the second LFSR during the given clock cycle may also correspond to the width of the host interface (e.g. see the previous description regarding the embodiment of the dither unit in FIG. 4).

In one set of embodiments, respective additional sets of pixel values may be fetched (e.g. in 802), with each respective additional set of pixel values corresponding to a different additional color plane of the color space. Accordingly, for each given additional color plane, a respective set of PRNs associated with the given color plane may be generated. Each given respective set of PRNs may be prevented from updating until a specified number of new pixel values corresponding to the given additional color plane (associated with the given respective set of PRNs) have been fetched since a most recent previous updating of the given respective set of PRNs. Similarly, each given respective set of PRNs may be updated once a specified number of new pixel values corresponding to the given additional color plane (associated with the given respective set of PRNs) have been fetched since a most recent previous updating of the given respective set of PRNs.

Numerous variations and modifications will become apparent to those skilled in the art once the above disclosure is fully appreciated. It is intended that the following claims be interpreted to embrace all such variations and modifications.

We claim:

1. A dither unit comprising:
    a hardware random noise generator (RNG), wherein an output of the RNG is used to provide dither-noise for injection into a video image frame; and
    a hardware control unit coupled to the RNG, and configured to:
        update the output of the hardware RNG responsive to receiving new image data for the video image frame;
        prevent a change in the output of the hardware RNG in a given clock cycle responsive to detecting that no new image data for the video image frame has been received in the given clock cycle; and
        provide unchanged dither-noise for the video image frame, responsive to preventing a change in the output of the hardware RNG, at least until new image data is received for the video image frame.

2. The dither unit of claim 1, wherein the hardware RNG is a linear feedback shift register (LFSR), and the output of the hardware RNG is an output of the LFSR.

3. The dither unit of claim 2, wherein to prevent a change in the output of the LFSR, the hardware control unit is configured to prevent a shift of the LFSR.

4. The dither unit of claim 1, further comprising:
    a hardware dither-value generating unit configured to generate the dither-noise according to results of a comparison of the output of the hardware RNG with one or more specified threshold values.

5. The dither unit of claim 1, wherein the dither unit is configured to seed the hardware RNG with a same unique non-zero seed for a same given video image frame.

6. A video pipe comprising:
    a plurality of linear feedback shift registers (LFSRs), wherein each given LFSR of the plurality of LFSRs corresponds to a respective plane of a color space, and is configured to provide pseudo-random numbers (PRNs) at its output;
    a hardware dither-noise injection unit (DIU) configured to:
        generate dither-noise values based on the PRNs output by the plurality of LFSRs; and
        inject the dither-noise values into image data of a given video image frame; and
    a hardware control unit configured to:
        update the output of a given LFSR of the plurality of LFSRs, responsive to receiving new image data for the given video image frame, when the received new image data is associated with the plane of the color space to which the given LFSR corresponds; and
        hold the output of a given LFSR of the plurality of LFSRs at its current value in a given clock cycle, responsive to detecting that no new image data associated with the plane of the color space to which the given LFSR corresponds has been received for the given video image frame in the given clock cycle;
    wherein the hardware DIU is configured to inject unchanged dither-noise values into the image data of the given video image frame, responsive to the hardware control unit holding the output of the given LFSR at its current value, at least until new image data is received for the given video image frame.

7. The video pipe of claim 6, wherein each given LFSR of the plurality of LFSRs is configured to output a first number of PRNs per clock cycle, wherein each given PRN of the first number of PRNs corresponds to a different given data segment of the image data, wherein for each given PRN of the first number of PRNs, the hardware DIU is further configured to:
    generate a respective dither-noise value based on the given PRN; and
    inject the respective dither-noise value into the given data segment of the image data to which the given PRN corresponds.

8. The video pipe of claim 7, wherein the hardware DIU is configured to generate the respective dither-noise value by comparing the given PRN to one or more threshold values associated with the respective plane of the color space to which the given LFSR outputting the given PRN corresponds.

9. The video pipe of claim 8, wherein the hardware DIU is configured to generate the respective dither-noise value by selecting the respective dither-noise value from a set of available dither-noise values according to a result of the comparison of the given PRN to the one or more threshold values.

10. The video pipe of claim 6, wherein the hardware control unit is configured to step a given LFSR of the plurality of LFSRs a specified number of times to update the PRNs output by the given LFSR.

11. A display pipe comprising:
a hardware fetch unit configured to fetch pixel data of a video frame; and
a hardware dither unit configured to:
receive the fetched pixel data;
generate pseudo-random numbers (PRNs) used for injecting dither-noise into the fetched pixel data;
update the PRNs in a given clock cycle responsive to detecting that the fetched pixel data includes new pixel data in the given clock cycle;
do not update the PRNs in the given clock cycle responsive to detecting that the fetched pixel data does not include new pixel data in the given clock cycle; and
generate dither-noise based on the PRNs, and keep the dither-noise unchanged, responsive to not updating the PRNs, at least until the fetched pixel data includes new pixel data for the video frame.

12. The display pipe of claim 11, wherein the hardware dither unit is further configured to inject the dither-noise into the fetched pixel data.

13. The display pipe of claim 11, wherein the hardware dither unit comprises a plurality of linear feedback shift registers (LFSRs) configured to provide the PRNs.

14. The display pipe of claim 13, wherein each given LFSR of the plurality of LFSRs is associated with a different color plane, and is configured to generate a set of PRNs to be associated with a subset of the fetched pixel data, wherein the subset of the fetched pixel data is pixel data of the color plane with which the given LFSR is associated.

15. A method comprising:
generating, by a graphics processing system, multiple sets of pseudo-random numbers (PRNs), each given set of PRNs of the multiple sets of PRNs corresponding to a different color plane of a color space;
injecting, by the graphics processing system, dither-noise into a video image frame represented in the color space, using the multiple sets of PRNs;
during each given clock cycle of an operating clock:
updating one or more PRNs in a given set of PRNs of the multiple sets of PRNs if new pixel data is received during the given clock cycle for the video image frame in the color plane to which the given set of PRNs corresponds;
keeping the one or more PRNs in the given set of PRNs at their current values if no new pixel data is received during the given clock cycle for the video image frame in the color plane to which the given set of PRNs corresponds; and
injecting unchanged dither-noise into the video image frame, responsive to said keeping the one or more PRNs at their current values, at least until new pixel data is received for the video image frame.

16. The method of claim 15, wherein generating the multiple sets of PRNs comprises:
seeding linear feedback shift registers (LFSRs); and
each given LFSR of the LFSRs generating a given output, wherein the given output generated by the given LFSR provides one given set of PRNs of the multiple sets of PRNs.

17. The method of claim 16;
wherein the updating one or more PRNs in a given set of PRNs comprises shifting the given LFSR that generates the given output providing the given set of PRNs, during the given clock cycle; and
wherein the keeping the one or more PRNs in the given set of PRNs at their current values comprises preventing the given LFSR that generates the given output providing the given set of PRNs from shifting during the given clock cycle.

18. A method comprising:
fetching, in a graphics processing system, video frame information represented in a first color space, comprising fetching first pixel values corresponding to a first color plane of the color space, and fetching second pixel values corresponding to a second color plane of the color space;
during each given clock cycle of an operating clock, generating, by the graphics processing system, first pseudo-random numbers (PRNs) associated with the first color plane, and generating, by the graphics processing system, second PRNs associated with the second color plane, comprising:
preventing the first PRNs from updating until a first number of new first pixel values have been fetched since a most recent previous updating of the first PRNs, and preventing the second PRNs from updating until a second number of new second pixel values have been fetched since a most recent previous updating of the second PRNs; and
updating the first PRNs once the first number of new first pixel values have been fetched since the most recent previous updating of the first PRNs, and updating the second PRNs once the second number of new second pixel values have been fetched since the most recent previous updating of the second PRNs;
generating, by the graphics processing system, first dither-values based on the first PRNs, and generating second dither-values based on the second PRNs; and
injecting, by the graphics processing system, the first dither-values into the fetched first pixel values, and injecting the second dither-values into the fetched second pixel values.

19. The method of claim 18, wherein the first number equals the second number, and corresponds to a width of a host interface over which the fetching of the video frame information is performed.

20. The method of claim 18, wherein the generating of the first PRNs comprises a first linear feedback shift register (LFSR) providing the first PRNs at its output, and wherein the generating of the second PRNs comprises a second LFSR providing the second PRNs at its output.

21. The method of claim 20, wherein each PRN of the first PRNs and each PRN of the second PRNs comprises a same specified number of bits;
wherein a number of bits output by the first LFSR during the given clock cycle corresponds to a width of a host interface over which the fetching of the video frame information is performed; and
wherein a number of bits output by the second LFSR during the given clock cycle corresponds to the width of the host interface over which the fetching of the video frame information is performed.

22. The method of claim 18, wherein the fetching of the video frame information further comprises:
fetching respective additional sets of pixel values, each respective additional set of pixel values of the additional sets of pixel values corresponding to a different additional color plane of the color space;

the method further comprising:
for each given additional color plane, generating an additional set of PRNs associated with the given color plane, comprising:
preventing each PRN of the additional set of PRNs associated with the given additional color plane from updating until a specified number of new pixel values corresponding to the given additional color plane have been fetched since a most recent previous updating of the additional set of PRNs associated with the given additional color plane; and
updating each PRN of the additional set of PRNs associated with the given additional color plane once the specified number of new pixel values corresponding to the given additional color plane have been fetched since the most recent previous updating of the additional set of PRNs associated with the given additional color plane.

\* \* \* \* \*